United States Patent [19]

Bonar

[11] Patent Number: 4,883,299
[45] Date of Patent: Nov. 28, 1989

[54] BUMPER

[76] Inventor: George D. Bonar, 333 Bowery, New York, N.Y. 10003

[21] Appl. No.: 178,540

[22] Filed: Apr. 7, 1988

[51] Int. Cl.$^4$ .............................................. B60R 19/10
[52] U.S. Cl. ................................................. 293/110
[58] Field of Search ........................ 293/107, 109, 110

[56] References Cited

U.S. PATENT DOCUMENTS

| 1,552,965 | 9/1925 | Smith | 293/110 |
| 1,709,494 | 4/1929 | Shoemaker | 293/110 |
| 3,574,379 | 4/1971 | Jordan | 293/109 |
| 3,900,222 | 8/1975 | Muller | 293/110 |
| 4,099,759 | 7/1978 | Kornhanser | 293/110 |
| 4,361,352 | 11/1982 | Wakamatsu | 293/109 |
| 4,613,177 | 9/1986 | Loren et al. | 293/109 |

Primary Examiner—Robert R. Song

[57] ABSTRACT

A cushioned bumper having a plurality of resilient inflated members attached to the outer portion of a conventional vehicle bumper, the enflated members having interconnecting valves therebetween the equalize pressures in all members upon impact of one or more members with another vehicle or other object.

4 Claims, 1 Drawing Sheet

BUMPER

BACKGROUND OF THE INVENTION

Ever since the invention of motor vehicles, and probably before that, on carts, wagons and the like, man has tried to efficiently protect said vehicles and their occupants from damage and injury by bumpers, fenders and cushioning means of all types and styles affixed to or integrally made on said vehicles. To date, no substantial advance has been made in this field, the motor vehicles have plastic or metallic bumpers on their front and rear portions, said bumpers in some cases being combined with springs for additional shock absorption, but primarily the bumpers are allarcuately shaped metal, which is easily dented and does not have much shock absorption. This is also a safety feature for animals and pedestrains, whereby an impact will result in much less injury to same also, less chance of whiplash and other damage. Insurance rates should also be progressively lower.

The present invention obviates the above detrimental characteristics of existing bumpers and sets forth a very efficient shock absorbing device which is not easily damaged and will cushion shocks to a vehicle and it's occupants to a greater degree than heretofore has been accomplished. Also, damage to the vehicle will be much less in "fender bender" collisions, and insurance rates should be progressively lower for the owner of the vehicle.

Objects of the invention

A primary object of the present invention is to provide an efficient and inexpensive shock absorbing means for vehicles.

A further object of the invention is to provide an efficient shock absorbing means for vehicles which is cushioned by air, liquid or a combination of both to absorb shocks from collisions and the like.

A further object of the invention is to provide a pneumatic bumper which is composed of one or more individual compartments.

Other and further objects of my invention will appear from the following drawing description, specification and claims.

DESCRIPTION OF THE DRAWINGS

Referring to the drawing in detail, FIG. 1 represents a top plan view of my improved bumper, showing a bumper arrangement 10, comprising a metallic bumper 12 of a standard type having resilient cushioning means 14 and 15 combined therewith, said cushioning means may be a single hollow resilient structure or a multi-chambered structure which can be inflated by valves 16, each of the individual chambers also being inflated at the same time thru valves 18 in adjoining walls of said chambers.

Figure 1:
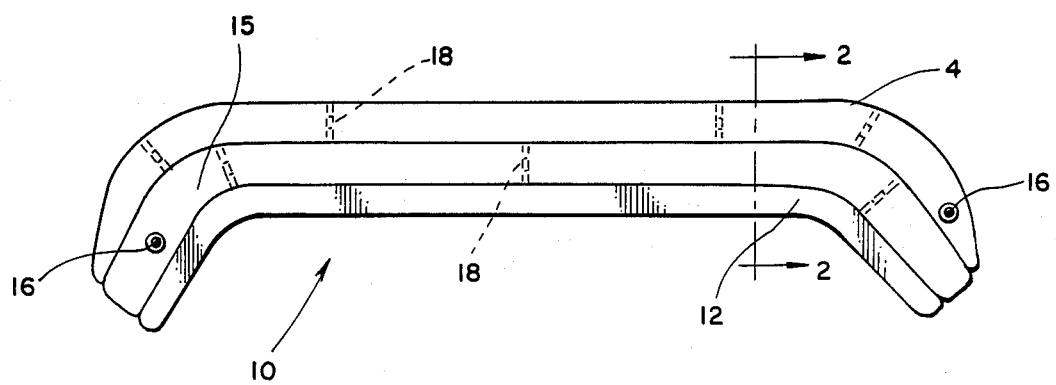
FIG. 1 shows a top plan view of my invention.
Figure 2:
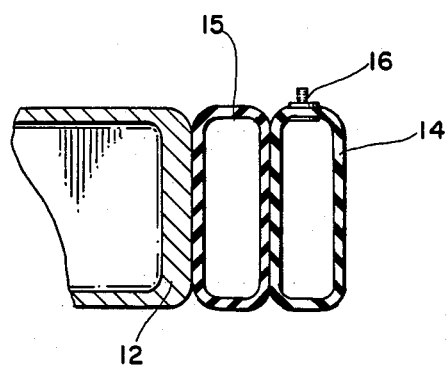
FIG. 2 shows a cross section taken along line 2—2 of FIG. 1.

These valves may simply be restricted openings in the walls of said members, one way check valves or valves of varying capacity, so that all chambers can be inflated by one pump attached to the main chamber, but they will not all deflate if one or more of the chambers is damaged by an impact. The individual chambers may be inflated to different pressures so that a progressive cushioning effect may be obtained when a collision occurs. This will also lessen the damage to animals and humans if an impact occurs between them and the vehicle. Also, insurance rates should be lower if bumpers like this are used. Also, the inflatant may be air, various suitable types of gases, or suitable liquids.

I claim:

1. A cushioned bumper for a vehicle, comprising a plurality of resilient inflated members attached to the outer portion of a conventional vehicle bumper, said inflated members having interconnecting valves therebetween to equalize pressures in all members upon impact of one or more members with another vehicle or other object.

2. A bumper as in claim 1 in which said resilient members are filled with a liquid.

3. A bumper as set forth in claim 1 in which said resilient members each have an inflating valve incorporated therewith.

4. A bumper as set forth in claim 1 in which said interconnecting valves are of varying capacity to allow for differential pressures.

* * * * *